(12) United States Patent
Manesis

(10) Patent No.: US 6,478,315 B1
(45) Date of Patent: Nov. 12, 2002

(54) WHEEL ASSEMBLY

(76) Inventor: Nick J. Manesis, P.O. Box 9474, San Diego, CA (US) 92169

( * ) Notice: Subject to any disclaimer, the term of this patent is extended or adjusted under 35 U.S.C. 154(b) by 0 days.

(21) Appl. No.: 09/723,415

(22) Filed: Nov. 27, 2000

(51) Int. Cl.$^7$ .............................. B62B 1/20; B60B 33/06
(52) U.S. Cl. ................ 280/37; 280/47.131; 280/47.19; 16/34
(58) Field of Search ........................ 280/37, 643, 645, 280/42, 651, 652, 43, 43.1, 47.131, 47.16, 47.17, 47.19, 47.2, 47.26, 47.34, 47.35; 16/34, 32; 190/18 A, 115

(56) References Cited

U.S. PATENT DOCUMENTS

| | | | | |
|---|---|---|---|---|
| 1,027,686 A | * | 5/1912 | Bollinger | 16/34 |
| 1,895,677 A | * | 1/1933 | Pinheiro | 190/18 A |
| 2,359,016 A | * | 9/1944 | Wood | 280/35 |
| 2,539,993 A | * | 1/1951 | Davis | 280/645 |
| 3,413,011 A | * | 11/1968 | Weitzner | 280/37 |
| 3,677,569 A | * | 7/1972 | Larson | 280/32.6 |
| 4,254,850 A | * | 3/1981 | Knowles | 190/18 A |
| 4,559,669 A | * | 12/1985 | Bonzer et al. | 16/44 |
| 4,679,670 A | | 7/1987 | Wickman | 190/18 A |
| 4,758,009 A | * | 7/1988 | Abel | 280/39 |
| 4,761,012 A | * | 8/1988 | Dames | 280/38 |
| 4,822,070 A | * | 4/1989 | Korona et al. | 280/47.2 |
| 5,147,019 A | * | 9/1992 | Hooreweder et al. | 190/18 A |
| 5,154,265 A | * | 10/1992 | Capistrant | 190/18 A |
| 5,253,389 A | * | 10/1993 | Colin | 16/30 |
| 5,575,036 A | * | 11/1996 | May | 16/34 |
| 5,653,458 A | * | 8/1997 | Chaparian | 280/30 |
| 5,758,752 A | | 6/1998 | King et al. | 190/18 A |
| 5,984,326 A | | 11/1999 | Abraham et al. | 280/47.2 |

* cited by examiner

*Primary Examiner*—Brian L. Johnson
*Assistant Examiner*—Bridget Avery
(74) *Attorney, Agent, or Firm*—Frank G. Morkunas

(57) ABSTRACT

A wheel assembly for use in combination with wheeled luggage to counter-balance gravitational forces exerted on the wheeled luggage when it is tilted forwarded and rolled. The wheel assembly has a shock-absorbing bias mechanism to absorb shock while transporting the wheeled luggage across a surface; a housing for the shock-absorbing bias mechanism; and a transport mechanism adjacent to the shock-absorbing bias mechanism to provide additional surface contact and load support to aid in rolling the wheeled luggage.

8 Claims, 3 Drawing Sheets

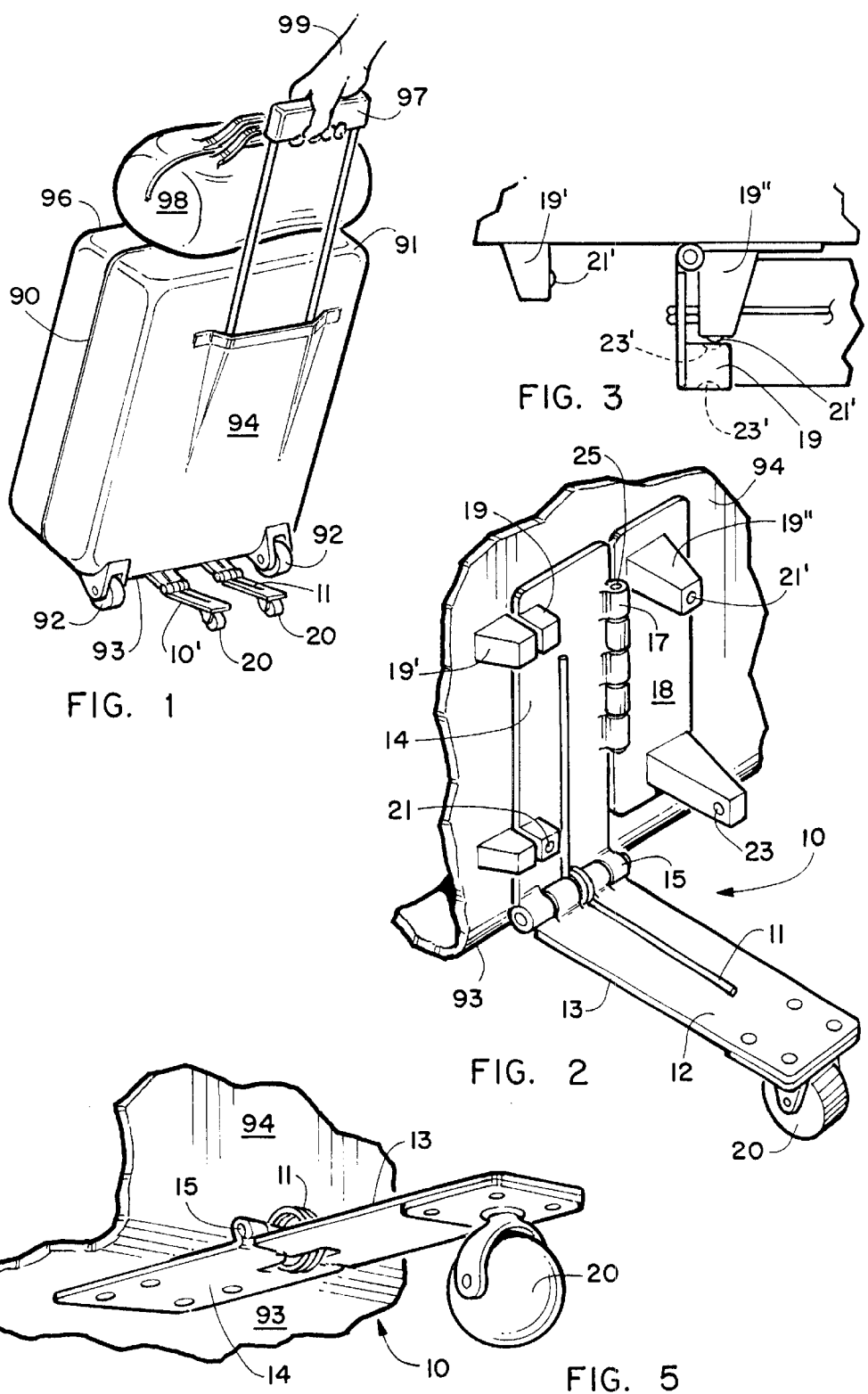

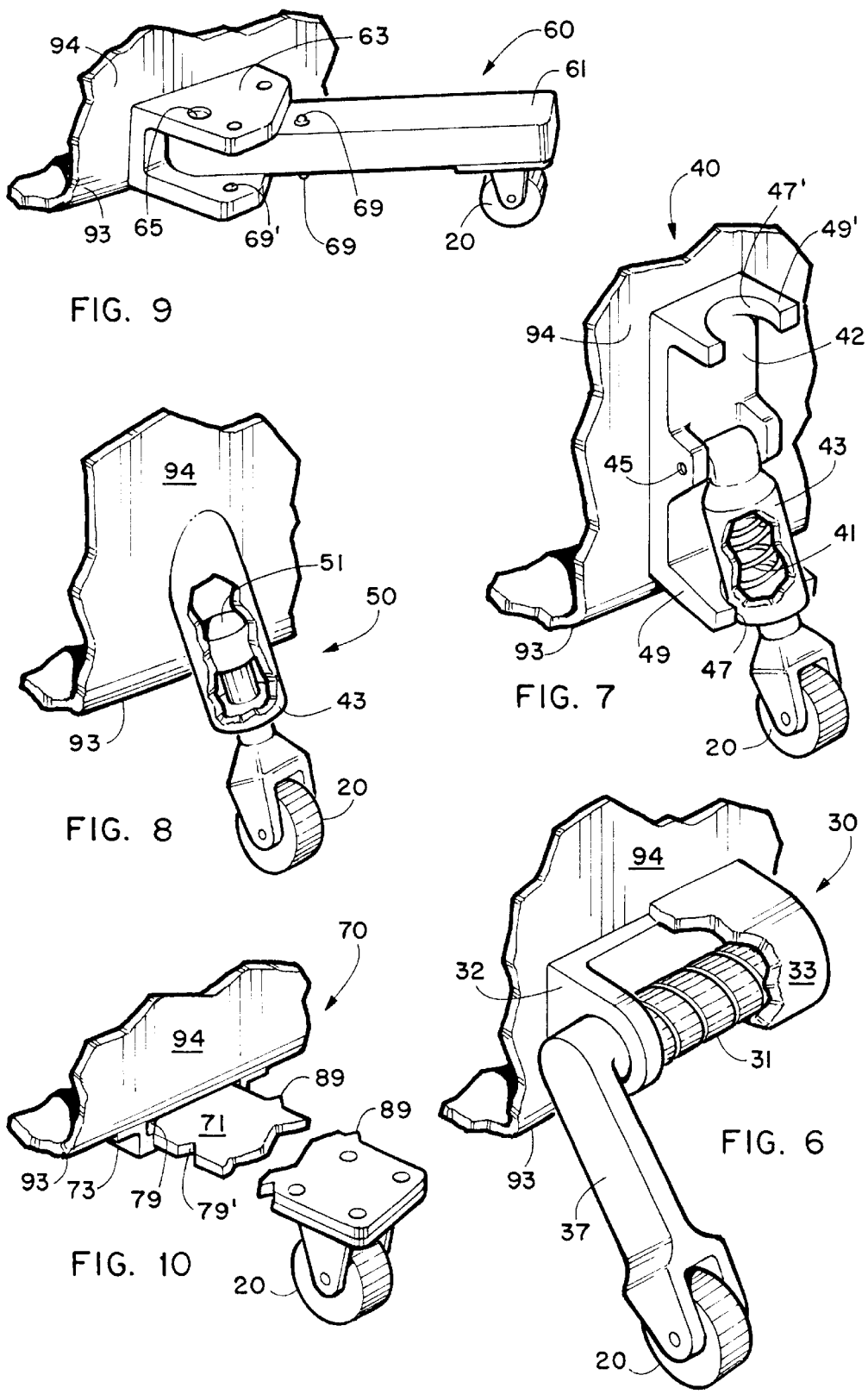

WHEEL ASSEMBLY

CROSS REFERENCES TO RELATED APPLICATIONS

None.

STATEMENT REGARDING FEDERALLY-SPONSORED RESEARCH OR DEVELOPMENT

Not applicable.

BACKGROUND OF THE INVENTION

This present invention relates to an improvement in wheel assemblies, and more particularly to wheel assemblies for use in conjunction with wheeled luggage to counter-act the gravitational force associated with wheeling packed and weighted luggage.

Traveling, be it by air, sea, or land, is an ever-increasing past-time and professional requirement in these modern times. With travel comes packing a suitcase (also referred to as luggage). Regardless of its size, when packed, luggage becomes quite heavy and at times cumbersome to manage. A most significant development in suitcases is the advent of wheeled luggage. Wheels, regardless of type, built into the bottom of a piece of luggage facilitate its movement from one point to another without much regard for weight of the contents or the strength of the traveler. Typically, wheeled luggage has a set of wheels on the bottom front or side of the luggage and a guide handle, generally retractable. To use, a traveler extracts the guide handle, tilts the luggage forward, and generally pulls (but may push) the luggage.

Packed luggage is heavy. When wheeled luggage is tilted forces of gravity will tend to force the luggage back to its original non-tilted position or completely down to the ground in the direction of the tilt. In which direction will depend on the angle of tilt, weight of luggage, and length of guide handle. Regardless, a gravitational force is at work which, when long distances must be traveled, can cause pain and discomfort for the traveler. Many times travelers place other luggage, bags, or brief case and the like, on top of the wheeled luggage and roll the wheeled luggage with the additional weight of this 'secondary luggage'. This is a very common practice as the extracted guide handle in conjunction with the top of the wheeled luggage form a convenient ledge for the placement of secondary luggage. Naturally, this additional weight results in more force at work and greater discomfort for the traveler wheeling the wheeled luggage. The discomfort level will increase with the distance to be traveled and the condition of the surface upon which the wheeled luggage is being rolled; i.e., relatively smooth and flat or bumpy. With more weight on the wheeled luggage, a greater distance to be traveled (particularly at hub airports), and some bumps or uneven surfaces, a traveler's discomfort level will be severe.

Attempts have been made to counter-balance the gravitational forces at work as described above. Two significant improvements to this effect are found in U.S. Pat. No. 5,758,752 issued on Jun. 2, 1998, to King and U.S. Pat. No. 5,984,326 issued on Nov. 16, 1999, to Abraham, et. al. The King patent ('752) relates to an automatically extendable (and retractable) wheel assembly for luggage. The Abraham patent ('326) relates to a roller mechanism for luggage (or any container or cart). King provides for automatic extension and retraction upon use or nonuse as the case may be. The wheel sets of King provide for stability of movement thereby relieving pressure and discomfort for the traveler. The Abraham device is a non-automatic retractable wheel assembly to be used primarily in conjunction with other wheeled containers which can also provide similar support as the King assembly. Both are rather cumbersome, somewhat complex, and do not accommodate for uneven surfaces. They each deliver a firm and stiff ride for the luggage, cannot absorb shocks associated with uneven surfaces and, thereby, cause discomfort, albeit mitigated, for the traveler. The geometry of the tilt remains the same (i.e., relationship of the luggage body, the handle, the decline [or tilt] angle, and the like, in relation to the traveler's hand remain constant). This causes discomfort and more significantly to a traveler who is shorter or taller than the average person. All in all, such devices are not very ergonomic.

The present invention provides for similar discomfort relief as do the King and Abraham devices but is more simple in design, easier to use, easier to manufacture onto luggage or to retro-fit existing luggage, and provides a shock-absorbing structure not seen in the prior art devices. The present invention is a simple mechanical structure which counterbalances the gravity exerted on the luggage as it is being pulled and, thereby, nearly completely reduces the discomfort level for the traveler. As a result, it is user-friendly and ergonomically suited for all.

Accordingly, several objects and advantages of my invention are to:

a. provide a better ergonomic design for traveler's luggage;
b. counterbalance the forces of gravity associated with a packed suitcase, with or without secondary luggage, when tilted;
c. provide for a smoother ride or roll for the wheeled luggage;
d. provide for more efficient and effective support for the wheeled luggage when secondary luggage is placed on the wheeled luggage;
e. provide for an easy-to-use stabilizing wheel assembly for wheeled luggage;
f. create an inexpensive wheel assembly for use with existing wheeled luggage;
g. maintain the convenience of existing luggage by providing a removable or retractable wheel assembly for wheeled luggage; and
h. provide for adjustment features to deal with different weight and geometries associated with rolling wheeled luggage.

The foregoing has outlined some of the more pertinent objects of the present invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF SUMMARY OF THE INVENTION

The above-noted problems, among others, are overcome by the present invention. Briefly stated, the present invention contemplates a wheel assembly for use in combination with wheeled luggage of any size to counter-balance gravitational forces exerted on the wheeled luggage when it is tilted forwarded and rolled. Typically when tilted, and depending on the tilt, gravitational forces are exerted pushing the top of the wheeled luggage downward. If additional weight (briefcases, duffel bags, other suitcases, and the like) are placed on top of the wheeled luggage, even greater forces are exerted. Rolling for long distances or over uneven surfaces further aggravates any discomfort experienced by the traveler trying to roll the luggage and hold it up against the gravitational forces tugging at it. The wheel assembly of the present invention has a shock-absorbing bias mechanism to absorb shock while transporting the wheeled luggage across a surface; particularly an uneven surface. It also has a housing for the shock-absorbing bias mechanism and a transport mechanism adjacent to the shock-absorbing bias mechanism (wheels or casters or the like) to provide additional surface contact and load support to aid in rolling the wheeled luggage to thereby relieve any discomfort for the traveler by counterbalancing the gravitational forces being exerted on the luggage.

The foregoing has outlined the more pertinent and important features of the present invention in order that the detailed description of the invention that follows may be better understood so the present contributions to the art may be more fully appreciated. Additional features of the present invention will be described hereinafter which form the subject of the claims. It should be appreciated by those skilled in the art that the conception and the disclosed specific embodiment may be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

For a fuller understanding of the nature and objects of the invention, reference should be made to the following brief descriptions in conjunction with the accompanying drawings:

FIG. 1 is a perspective view of existing wheeled luggage having one embodiment of the wheel assembly thereon.

FIG. 2 is a detailed view of one embodiment of the wheel assembly in the open state.

FIG. 3 is a detailed view of the retaining mechanism, in the closed state, for one embodiment of the wheel assembly.

FIGS. 5–10 are detailed views of several other embodiments of the wheel assembly.

DETAILED DESCRIPTION OF THE INVENTION

Figure 4:
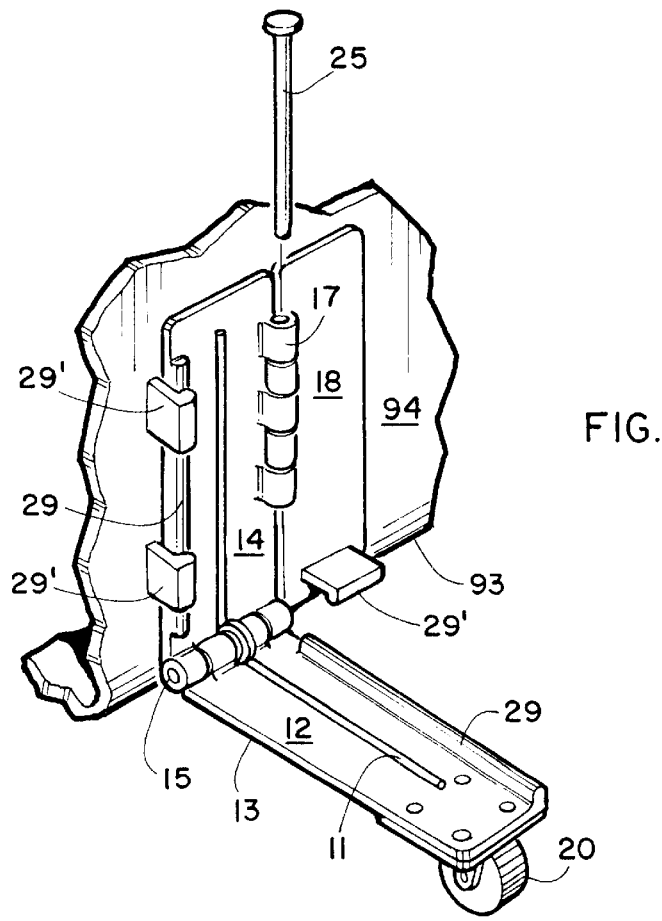
FIG. 4 is a detailed view of a second embodiment of the retaining mechanism for the wheel assembly.

Referring now to the drawings in detail and in particular to FIG. 2, reference character 10 generally designates a wheel assembly constructed in accordance with a preferred embodiment of the present invention. FIG. 1 depicts generally how most of the embodiments of the present invention may be applied to luggage 90 which illustrates two such sets. There may be only one set, however, or more than two sets. The wheel assembly 10' as illustrated in FIG. 1 is shown in more detail in FIG. 5. The luggage 90 generally has a top 91, a bottom 93, a front 94, and a back 96. With wheeled luggage, and for reference purposes only, the front 94 is depicted as that section facing the direction of travel. Consequently, wheels 92 generally are on or near the front 94 and bottom 93. A guide handle 97, generally retractable and held and move by a user 99, is usually at or near the front 94 and top 91.

With these reference points, disclosure now will center about FIGS. 2–3. The wheel assembly 10 has a housing 13 composed of a first plate 14 and a second plate 12 connected together by a hinge or pivot point 15. This configuration resembles a basic hinge. The first plate 14 abuts the front 94 of the luggage when in an open state as illustrated in FIG. 2. In this open state, the second plate 12 projects forward of the front 94 generally perpendicular to the front 94. This wheel assembly 10 is held onto the luggage 90 at hinge or swivel point 17. This swivel point 17 may be directly attached to the front 94 of the luggage or may be attached to a third plate 18 which is attached to the front 94 of the luggage.

As configured, the first plate 14 may swivel side to side, to an open state or to a closed state, on swivel point 17 and may pivot up and down on pivot point 15. At the heart of this wheel assembly 10 is the shock-absorbing and counter-balancing mechanism which, in this embodiment is a torsion-like spring 11 having one end connected to the first plate 14 and the other end connected to the second plate 12 and fashioned such that the two ends of the torsion spring 11 meet in coiled relationship to one another at or near the pivot point 15 and are at approximate right angles to one another.

To maintain the open state or the closed state, as desired, there is a retaining mechanism. The retaining mechanism in FIGS. 2 and 3 consists of one or more first retaining members 19 on one side of the first plate 14 and corresponding second retaining members 19' on the front 94 (and adjacent to the first retaining members 19 when in an open state) to secure an open state, and corresponding third retaining member 19" near to, but away from, the other side of the first plate 14 and opposite the swivel point 17 to secure a closed state. These retaining members have cooperating detents 21, 21', apertures 23, 23', snaps, and other retaining mechanisms suited for the intended purpose of receiving and retaining the first plate 14 of the wheel assembly 10 into an open state for use by a traveler or receiving and retaining the first plate 14 into a closed state to minimize the dimensions and obstructions of the luggage 90 when wheeling it is no longer desired.

The shock-absorbing and counter-balancing bias mechanism (torsion spring 11 in this embodiment) as illustrated in FIG. 2 is of such strength to prevent the first plate 14 from pivoting downward (to an acute angle with the second plate 12) or upward (to an obtuse angle with the second plate 12) without application of force. Force, naturally, will be applied when the luggage 90 is tilted forward for wheeling. As described earlier, the shock-absorbing and counter-balancing bias mechanism 11 is contained within and forms part of the housing 13 which is composed of the first plate 14, the second plate 12, and the pivot point 15. To facilitate ease of rolling the wheeled luggage 90, a transportation mechanism 20 is connected to the shock-absorbing and counter-balancing bias mechanism 11 and housing 13. Typically, any wheel or rolling device may be used, such as, but not limited to, standard wheels and casters. In all embodiments, these wheels are adjacent to the shock-absorbing and counter-balancing bias mechanism. Although the torsion spring 11 is sufficiently strong to prevent upward or downward movement of the first plate 14 without application of force, the first plate 14 will pivot upward when the luggage 90 is tilted forward (i.e., the first plate 14 and the second plate 12 will begin to converge); more so when the luggage 90 is packed and even more so when secondary luggage 98 is placed thereon. The strength of the torsion spring 11, however, will permit only a limited downward movement of the first plate 14. Spring strength should be sufficient to permit such downward movement of between 20° and 45° (as measured forward and downward from the luggage in an original upright position of 90° relative to the ground surface but being 0° relative for the measurement of the forward and downward movement) based on the weights of the luggage 90 and secondary luggage 98. This concept holds true of all the varying types of shock-absorbing and counter-balancing bias mechanisms usable on the various embodiments of this invention. Such shock-absorbing and counter-balancing bias mechanisms must be capable of absorbing shock as the wheeled luggage is rolled about.

Figure 4A:
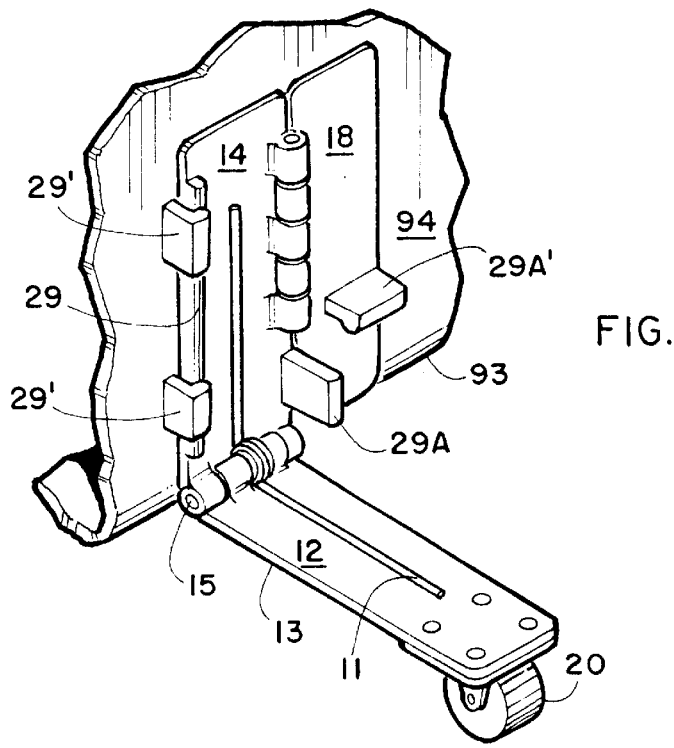
FIG. 4A is a detailed view of a another embodiment of the retaining mechanism for the wheel assembly.

FIGS. 4 and 4A depict the wheel assembly 10 as described above except that the retaining mechanisms are ridges or extensions 29, 29A which could be on one side or on both sides of the first plate 14, and corresponding clips 29' on the front 94 of the luggage on opposing sides of the first plate 14 to capture and hold the housing 13 either in the open state or in the closed state as desired by the user. A ridge 29A also may be fashioned on the second plate 12 such that the second plate 12 may be captured and held in the closed state by clip 29A' adjacent to the swivel point 17. FIG. 4 also illustrates that, when not in the open state, rather than placing the housing into the closed state, the housing 13 may be removed from the luggage 90 by use of a removable hinge pin 25 which, when in place, maintains the housing 13 onto the swivel point 17 and when removed, permits the complete removal of the housing 13 from the luggage 90.

FIG. 6 is yet another embodiment of the wheel assembly 30. Here the shock-absorbing and counter-balancing bias mechanism 31 is contained within the holding member 32. The holding member 32 is attached to the front 94 of the luggage 90 at or near the bottom 93. The shock-absorbing and counter-balancing bias mechanism is housed by a cover 33. A pivotable extension arm 37 projects from the holding member 32 and downward. A wheel 20 is attached to the pivotable extension arm 37. The shock-absorbing and counter-balancing bias mechanism 31 in this embodiment may be a friction hinge, friction spring, coil spring, torque hinge, or torsion spring or similar such shock-absorbing and counterbalancing bias mechanism provided the shock-absorbing and counter-balancing bias mechanism 31 has sufficient strength to prevent movement of the extension arm 37 without some application of force or weight as described earlier herein and that the angle of tilt may be maintained.

The embodiments illustrated in FIGS. 7 and 8, wheel assemblies 40 and 50 respectively, are similar except that the wheel assembly 40 in FIG. 7 is swivelable into an open state (down and locked into reference character 49) or into a closed state (up and locked into reference character 49') whereas the wheel assembly 50 depicted in FIG. 8 is fixed in place into the luggage at or near the bottom 93 front 94 thereof. Each wheel assembly 40, 50 has a housing 43 generally cylindrical in shape; although any geometric shape will suffice. The shock-absorbing and counter-balancing bias mechanism 41, 51 respectively may be a compression spring, a hydraulic spring or device, a pneumatic spring or device, a gas spring or device, or a damper, or similar bias mechanisms suited for the intended purpose of absorbing shock and maintaining a tilt angle as earlier described. A wheel is fashioned at the end of each housing and shock-absorbing and counter-balancing mechanism.

Turning to FIG. 7, this wheel assembly 40 is swivably attached to a swivel member 45. The swivel member 45 is part of the holder 42. The holder 42 is attached to the front 94 of the luggage 90 at or near to the bottom 93. There is a first retaining section 49 adjacent to the bottom of the holder 42 and a second retaining member adjacent to the top of the holder 42. Each has an opening 47, 47' adapted to accommodate and hold in place the cylinder 43 as it is swivelled down and into the open state (as illustrated) and held thereat in opening 47; or as it is swivelled up and into the closed state and held thereat in opening 47'. With a round-like cylinder 43, the openings 47, 47' would be somewhat greater than 180° and somewhat flexible to thereby permit entry of the cylinder 43 therein and yet grasp and hold it thereat. A strap, clasp, pin, or similar article (not shown)also could be used to tie down or securely hold the cylinder 43 in the open state.

FIG. 9 illustrates yet another embodiment of the wheel assembly 60. Here the housing for the shock-absorbing and counter-balancing bias mechanism 61 is a retaining bracket 63 which is attached to the front 94 of the luggage 90 at or near the bottom 93. Here also the shock-absorbing and counter-balancing bias mechanism 61 is a torsion-bar-like bias member which will bend with pressure and yet maintain the features of tilt angle as previously described. In this embodiment the shock-absorbing and counter-balancing bias mechanism 61 is retractable and registerable in an open state or into a closed state. It pivots on hinge pin 65, which, also may be removable. The registration mechanism here is composed of one or more sets of corresponding detents 69 and holes 69' (or apertures), or corresponding tooth and groove structures.

The last embodiment is illustrated in FIG. 10. In this embodiment, the housing for the wheel assembly 70 is a sleeve 73 attached to the bottom 93 of the luggage. The shock-absorbing and counter-balancing bias mechanism 61 is a torsion-bar-like article which is slideable into and out of the sleeve 73 (a torsion-spring-like structure may also be used for this purpose). It also has one or more sets of cooperating adjustment members on the sleeve 73 and on the torsion bar 71. These adjustment members may be cooperating tooth 79 and groove 79', or detents 89 and cooperating apertures (not visible). The shock-absorbing and counter-balancing bias mechanism 71 may be removed completely from the sleeve housing 73 or it may be pushed fully into the sleeve housing 73 (closed state) thereby leaving little, if any, obstruction to the storage of the luggage 90. The adjustment members permit any one or more partially open states depending on the tilt angle desired by the traveler.

FIG. 1 illustrated two sets of wheel assemblies 10 of the present invention. It must be understood that, with any of the embodiments disclosed herein, one or more sets may be manufactured into or retrofitted to luggage 90.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not by the embodiments illustrated, but by the appended claims and their legal equivalents.

The invention claimed is:

1. A wheel assembly for use in combination with wheeled luggage, said wheeled luggage having a front, a back, a top with a guide handle adjacent to the top, and a bottom with wheels adjacent to the bottom front, said wheel assembly comprising:
   (a) shock-absorbing means to absorb shock while transporting the wheeled luggage across a surface;
   (b) housing for said shock-absorbing means, said housing comprising a first plate swivelably attached to the front of the wheeled luggage adjacent to the bottom, and a second plate pivotably attached to the first plate and extendable outward from the front of the wheeled luggage; and
   (c) transport means adjacent to said shock-absorbing means, said transport means to provide additional surface contact and load support to aid in transporting the wheeled luggage.

2. The wheel assembly as claimed in claim 1 wherein said first plate is removable.

3. The wheel assembly as claimed in claim 1 wherein said shockabsorbing means comprises said first plate and said second plate and a bias member having one end extending over said first plate and having another end extending over said second plate.

4. The wheel assembly as claimed in claim 1 further comprising a retaining means for retaining said wheel assembly in an open state with said second plate extended outward from and perpendicular to the front of the wheeled luggage, or in a closed state with said second plate swivelled parallel to the front of the wheeled luggage.

5. The wheel assembly as claimed in claim 4 wherein said retaining means comprises a first retaining member on the housing in cooperating relationship with a second retaining member on the front of the wheeled luggage to retain said wheel assembly in an open state when swivelled open, and further comprising a third retaining member in cooperating relationship with said first retaining member to retain said wheel assembly in a closed state when swivelled closed.

6. The wheel assembly as claimed in claim 5 wherein said first, second, and third retaining member comprise corresponding detents and apertures.

7. The wheel assembly as claimed in claim 5 wherein said third retaining member is attached directly to the front of the wheeled luggage.

8. The wheel assembly as claimed in claim 5 further comprising a third plate attached to the front of said wheeled luggage and swivelably connected to said first plate wherein said third retaining member is attached to said third plate.

* * * * *